(12) United States Patent
Mann et al.

(10) Patent No.: US 6,321,345 B1
(45) Date of Patent: Nov. 20, 2001

(54) SLOW RESPONSE IN REDUNDANT ARRAYS OF INEXPENSIVE DISKS

(75) Inventors: Bruce E. Mann, Mason; Philip J. Trasatti, Brookline; John A. Ywoskus, Merrimack, all of NH (US)

(73) Assignee: Seachange Systems, Inc., Maynard, MA (US)

( * ) Notice: Subject to any disclaimer, the term of this patent is extended or adjusted under 35 U.S.C. 154(b) by 0 days.

(21) Appl. No.: 09/260,262

(22) Filed: Mar. 1, 1999

(51) Int. Cl.$^7$ .............................. G06F 12/16; G06F 11/00
(52) U.S. Cl. ................................. 714/6; 711/114
(58) Field of Search .................. 714/5, 6, 7, 8, 714/47, 48, 55, 798, 814, 815; 713/500, 502; 711/112, 114; 709/100

(56) References Cited

U.S. PATENT DOCUMENTS 5,754,804 * 5/1998 Cheselka et al. ............... 710/126
5,758,057 * 5/1998 Baba et al. ..................... 714/7
5,862,312 * 1/1999 Mann et al. ..................... 714/6

OTHER PUBLICATIONS

"The RAIDBook, A Source Book for RAID Technology," The RAID Advisory Board, p. 23 and 38, Jun. 1993.*

* cited by examiner

Primary Examiner—Norman M. Wright
Assistant Examiner—Christopher A. Revak
(74) Attorney, Agent, or Firm—Fish & Richardson P.C.

(57) ABSTRACT

A redundant array includes a plurality of disks, a bus coupling the disks, a receiving device, and a device to reconstruct a block stored in one of the disks. The device reconstructs the block with associated data and parity blocks from other disks. The device transmits the reconstructed block to the receiving device in response to the one of the disks being slowly responding. A method includes requesting a first disk to transmit a first block, reconstructing, when necessary, the first block from associated data stored in other disks of a RAID configuration, and transmitting the reconstructed block directly to a receiving device. The transmitting is in response to the first disk not transmitting the block in a predetermined time.

16 Claims, 4 Drawing Sheets

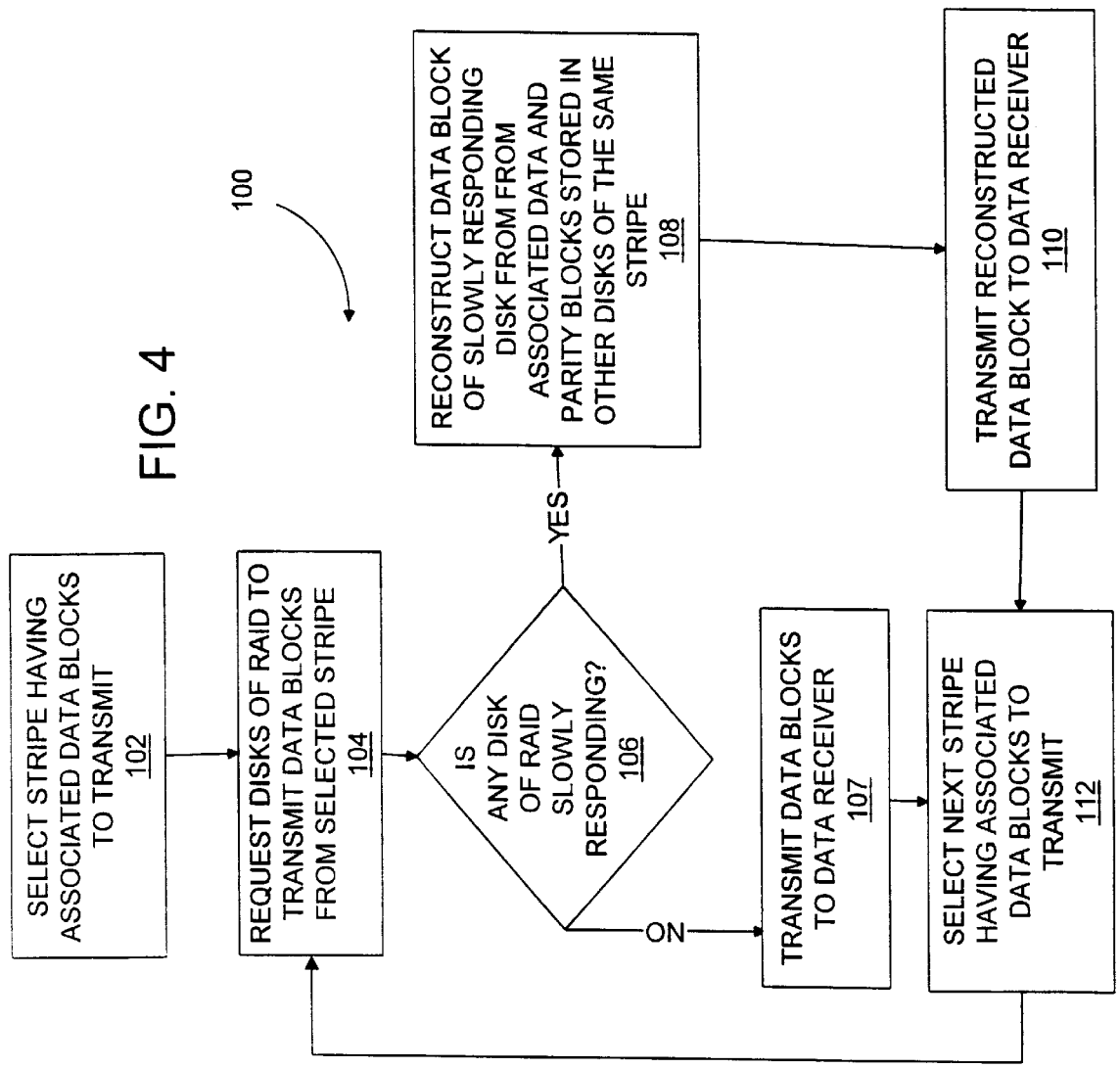

SLOW RESPONSE IN REDUNDANT ARRAYS OF INEXPENSIVE DISKS

BACKGROUND OF THE INVENTION

This invention relates generally to the transmission and storage of data and, more particularly, to managing response times in redundant arrays of inexpensive disks.

Digital video and television systems need high bandwidth data transmission and low latencies. Redundant arrays of inexpensive disks (RAID) support high bandwidth data transfers and very low latencies. RAID configurations employ redundancy and/or parity blocks to mask the failure of a disk.

RAID configurations divide a received data stream into a sequence of blocks and write consecutive blocks of the sequence to different disks in the array. To retrieve data, the RAID configuration reads the blocks from the disks of the array and reconstitutes the original data stream from the read blocks. To increase reception and transmission speeds, the RAID configuration may write to and read from the various disks of the array in parallel.

Individual disks of a RAID configuration will occasionally stall or respond slowly to an access request due to disk surface defects and bad block revectoring. During a slow response, the entire RAID configuration may wait while one disk transmits requested data. Thus, a single slowly responding disk can cause a long latency for a read operation from the RAID configuration.

For digital video and cable systems, one slowly responding disk can cause a disaster, because data needs to arrive at a video receiver at a substantially constant rate to keep the receiver's input buffer full. Continued long transmission latencies can deplete the input buffer. A receiver's input buffer is typically only large enough to store about 1 to 2 of video data, i.e. several megabytes of data. If a slow RAID configuration causes a transmission gap of longer than about 1 to 2, the receiver's input buffer may completely empty. If the receiver's input buffer empties, a viewer may perceive a noticeable pause in the video being viewed. Defect-free transmission of video requires that such pauses be absent.

RAID configurations are economically attractive, because they provide low latencies and high bandwidth data storage using inexpensive disks. But, contemporary inexpensive disks often have bad regions, which occasionally lead to bad block revectoring and slow disk responses. A bad region can cause a read, which normally lasts about 10 milliseconds (ms), to take 1,000 ms or more. Thus, slow responses can cause unpredictable read latencies. These latencies make RAID configurations less acceptable in video transmitters, because transmission latencies can lead to the above-discussed problems in video reception.

The present invention is directed to overcoming, or at least reducing the effects of, one or more of the problems set forth above.

SUMMARY OF THE INVENTION

One object of the invention is to reduce the number of transmission gaps caused by slowly responding disks of a RAID configuration.

Another object of the invention is to provide a RAID configuration with predictable read latencies.

In a first aspect, the invention provides a RAID configuration. The RAID configuration includes a plurality of disks, a bus coupled to the disks to transmit data blocks, and a device to reconstruct a block stored in any one of the disks. The device reconstructs the block with associated data and parity blocks received from other disks. The device transmits the reconstructed block to a receiving device in response to one of the disks responding slowly.

In a second aspect, the invention provides a method of transmitting data from a RAID configuration. The method includes requesting that a first disk of the RAID configuration transmit a first block, reconstructing the first block from associated blocks stored in other disks of the RAID configuration, and transmitting the reconstructed first block directly to a receiving device. The step of transmitting is performed if the first disk does not complete transmission of the first data block within a predetermined time.

In a third aspect, the invention provides a RAID configuration, which stores parity and data blocks in stripes across the disks. The RAID configuration includes a plurality of disks and a processor connected to the disks. The processor is adapted to write a plurality of groups of associated data and parity blocks to the disks. The processor writes the data and parity blocks of each group to different ones of the disks and writes at least two blocks from different groups to one stripe.

In a fourth aspect, the invention provides a RAID configuration to transmit data blocks to a receiving device. The RAID configuration includes a plurality of disks, a processor to control reads from and writes to the disks, and a device to reconstruct blocks. The disks store blocks and transmit stored blocks to the receiving device. The processor determines if disks are slowly responding. The device reconstructs a block stored in a slowly responding one of the disks from associated blocks stored in the remaining disks if the processor determines that the one of the disks is slowly responding.

BRIEF DESCRIPTION OF THE DRAWINGS

Other objects, features, and advantages of the invention will be apparent from the following description taken together with the drawings, in which:

FIG. 4 is a flow chart illustrating a method of transmitting data from the RAID configuration of FIG. 1;

DESCRIPTION OF THE PREFERRED EMBODIMENTS

U.S. patent application Ser. No. 08/547,565, filed Oct. 24, 1995, discloses several types of RAID configurations and is incorporated by reference herein in its entirety.

Figure 1:
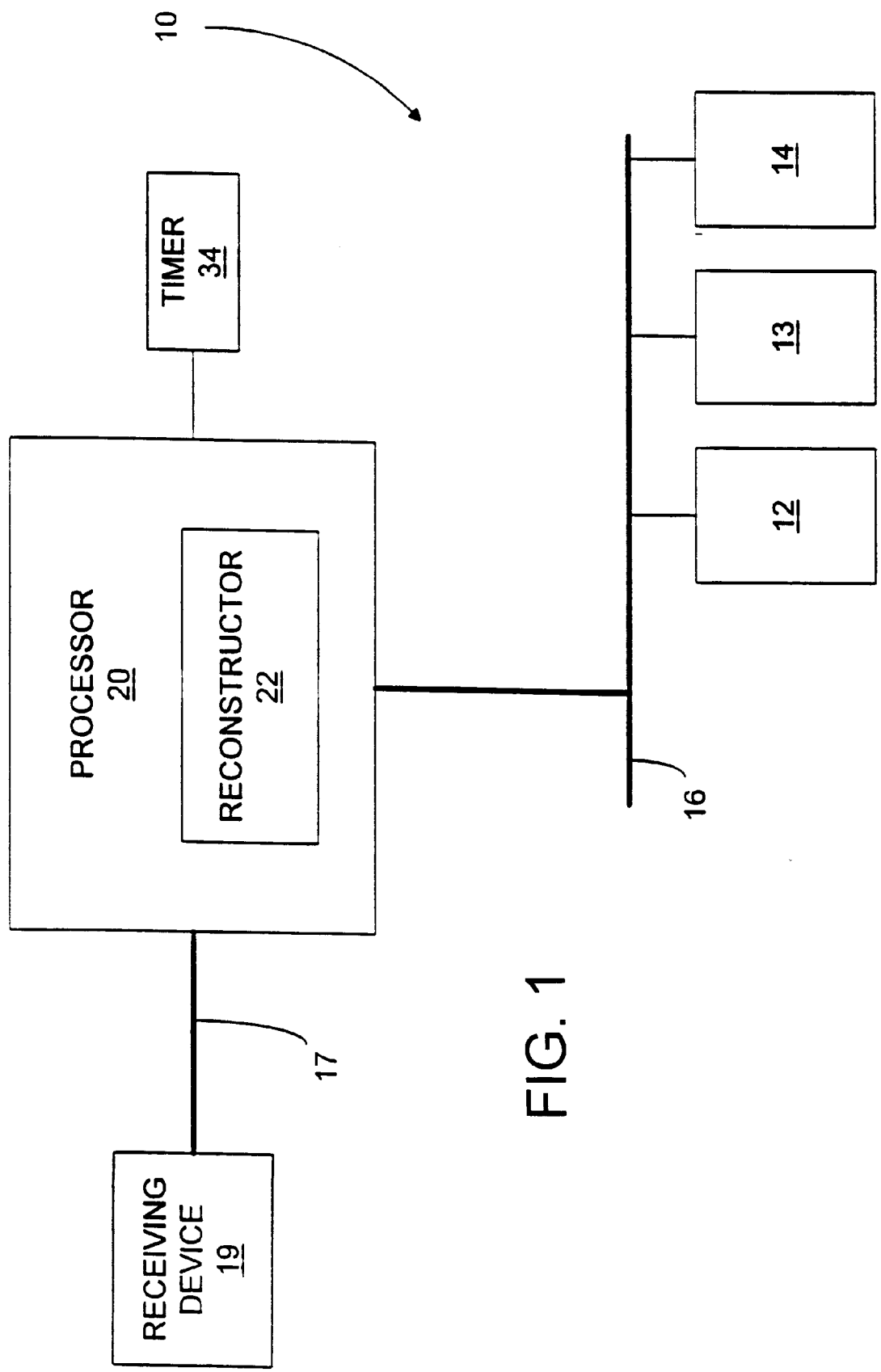
FIG. 1 shows one embodiment of a redundant array of inexpensive disks (RAID) configuration having a predictable read latency.

FIG. 1 shows a RAID configuration 10 having three storage disks 12, 13, 14. The RAID configuration 10 has a bus 16 for data writes to and reads of the three disks 12–14. Generally, embodiments may have N disks. A processor 20 controls writes to and reads of the disks 12–14. The writes and reads are for data and/or parity blocks. The processor 20 includes a reconstructor 22 to reconstruct data blocks of slowly responding disks. The processor 20 transmits data blocks over an interface or line 17, for example, a bus or a cable, to a receiving device 19.

In some embodiments the bus 16 has separate data and control lines (not shown) for each of the disks 12–14. Then, reads and writes may be parallel accesses to all or to a subset of the disks 12–14. In other embodiments a single set of data and control lines connects to each disk 12–14 of the RAID configuration 10. Then, the processor 20 performs serial writes to and reads from the separate disks 12–14 over the shared data line. In this case, the bus 16 may be a single SCSI bus or another type of shared or dedicated interconnect.

A disk is slowly responding if the disk does not complete a requested read within a predetermined time, but still sends signals, e.g., to the processor 20, indicating that the read is progressing. The predetermined time is longer than a normal time for completing the requested read. A slowly responding disk may store the requested data in a readable form and may eventually complete the requested read, i.e. the disk is responding and not stalled.

Figure 2A:
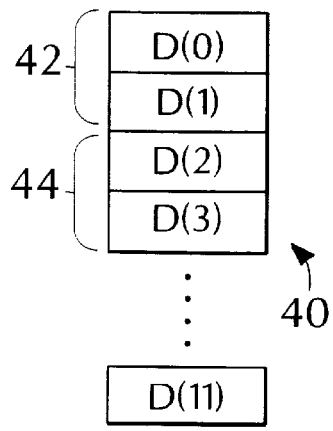
FIG. 2A shows a fragment of a data stream sent to the RAID configuration of FIG. 1 for storage therein.

FIG. 2A shows a fragment 40 of a data stream to store in the RAID configuration device 10 of FIG. 1. In this illustrative embodiment, the processor 20 divides the fragment 40 into an ordered sequence of blocks D(0), D(1), . . . D(11) and produces a parity block P(i, i+1) (i=0, 2, 4, . . . ) to associate with consecutive pairs 42, 44 of the data blocks D(i), D(i+1). The parity block P(i, i+1) encodes at least one parity bit for each pair of equivalent bits of the associated pair 42, 44 of data blocks D(i), D(i+1). The processor 20 may write each associated pair 42, 44 of data blocks D(i), D(i+1) and parity block P(i, i+1) to the three disks 12–14 in parallel or serially as explained with respect to FIG. 1.

Henceforth, a stripe refers to a correspondingly positioned set of storage locations in each disk 12–14 of the RAID configuration 10. Each stripe includes the same number of storage locations from each disk 12–14.

Nevertheless, an array of disks may allow several definitions of stripes. For example, an array with disks A and B may assign storage locations 101 to 200 of both disks A and B to a first stripe and assign storage locations 201 to 300 of both disks A and B to a second stripe. In the same array, a second definition may assign locations 101 to 200 of disk A and locations 201 to 300 of disk B to the first stripe and assign locations 201 to 300 of disk A and locations 101 to 200 of disk B to a second stripe.

Figure 2B:
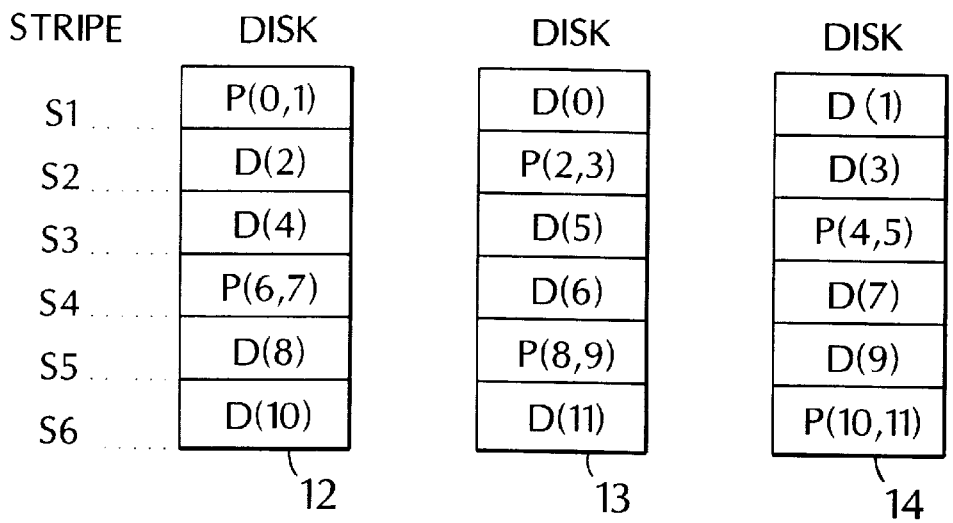
FIG. 2B is a schematic illustration of how the RAID configuration of FIG. 1 stores the data fragment of FIG. 2A.

FIG. 2B schematically illustrates how the processor 20 writes data and parity blocks in the disks 12–14. The storage locations of the three disks 12–14 are arranged in stripes S1–S6. Each stripe S1–S6 stores a group of three associated blocks, which includes a consecutive pair of data blocks D(i), D(i+1) and the parity block P(i, i+1) constructed from the pair. The portion of each disk 12–14 in a particular stripe S1–S6 stores either one of the data blocks D(i), D(i+1) or the associated parity block P(i, i+1). The processor 20 writes the parity blocks P(i, i+1) associated with sequential pairs to different ones of the disks 12–14 by cyclically shifting the storage location of P(i, i+1) in each consecutive stripe. This is referred to as rotating the parity blocks P(i, i+1) across the disks 12–14. Rotating the storage location of the parity block more uniformly distributes the data blocks D(j) among the disks 12–14 thereby spreading the access burdens more uniformly across the different disks 12–14 during data reads and writes.

The configuration shown in FIGS. 1 and 2B is often referred to as a RAID-5 configuration.

Figure 3:
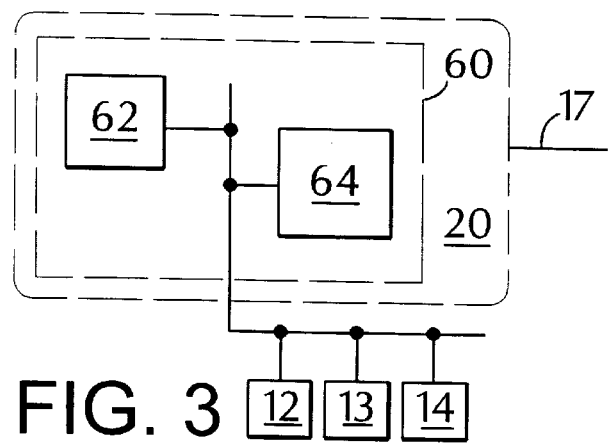
FIG. 3 illustrates an embodiment of a reconstructor of data blocks for use in the RAID configuration of FIG. 1.

FIG. 3 illustrates an embodiment 60 of the reconstructor 22 of FIG. 1, which includes a memory device 62 and a hardware processor 64. Both the memory device 62 and the processor 64 couple to the bus 16. The memory device 62 receives data and/or parity blocks from the disks 12–14 via the bus 16. The memory device 62 stores the associated data and parity blocks for reconstructing the associated block of a slowly responding disk 12–14.

The processor 64 performs an exclusive OR (XOR) of the associated parity and data blocks to reconstruct the data block of the stalled disk 12–14. To perform the XOR, the processor 64 reads the associated blocks from the memory device 62. Then, the processor 64 XOR's corresponding bits of the read associated parity and data blocks in a bit-by-bit manner. Finally, the processor 64 writes the results of the XOR back to the memory device 62. The reconstructor 60 can make a reconstructed block for any one of the disks 12–14.

FIG. 4 is a flow chart illustrating one method 100 of transmitting data from the RAID configuration 10 shown in FIGS. 1 and 2B. At step 102, the processor 20 selects to transmit the associated data blocks of the stripe S1. At step 104, the processor 20 requests that the disks 13–14 to transmit the data blocks of the selected stripe S1. At step 106, the processor 20 determines whether any of the disks 13–14 is slowly responding. At step 107, the processor 20 transmits the requested data blocks if neither disk 13–14 is slowly responding. At step 108, the reconstructor 22 reconstructs the data block of a slowly responding disk 13–14, from the associated data block and parity (from disk 12). The reconstructor 22 receives the associated data and parity blocks from storage locations of the same stripe S1 of the other disks 12–14, which are not slowly responding. At step 110, the reconstructor 22 transmits the reconstructed data block to the data receiver 19. At step 112, the processor 20 selects the next stripe S2 of associated data blocks to transmit in response to completing transmission of the data blocks of the stripe S1 at step 106 or 110.

Referring to FIGS. 1 and 2B, the RAID configuration 10 uses a timer 34 to determine whether any of the disks 12–14 are slowly responding. The processor 20 resets the timer 34 at the start of each cycle for transmitting the data blocks from one of the stripes S1–S6. The timer 34 counts a predetermined time and signals the processor 20 when the time has elapsed. In response to the signal from the timer 34, the processor 20 determines whether each disk 12–14 has completed transmission of the data block stored therein, i.e. whether any disk 12–14 is slowly responding.

The processor 20 may determine that one of the disks 12–14 is slowly responding even though the disk 12–14 continues to send "handshaking" signals to the processor 20 indicating normal operation.

Referring to FIGS. 1–3, the processor 20 controls the reconstruction and the transmission of reconstructed data blocks. First, the processor 20 orders the remaining disks 12–14 to transmit the associated blocks to the reconstructor 22, e.g., to the memory device 62, if a slowly responding disk 12–14 is detected. In FIG. 2B, the associated data and parity blocks are stored in the same stripe S1–S6 as the untransmitted data block from the slowly responding disk 12–14. Thus, the processor 20 orders reads of the associated stripe S1–S6 to obtain the associated blocks. Next, the processor 20 signals the reconstructor 22 to reconstruct the data block from a slowly responding disk, e.g., by a signal sent to the processor 64 of FIG. 3. Then, the processor 20 reads the reconstructed block from the reconstructor 22, e.g., the memory device 62, and transmits the reconstructed block to the interface or line 17.

Referring to FIGS. 1–3, the processor 20 does not interrupt a slowly responding disk 12–14 from recovering by sending to the disk 12–14 a second request to transmit data. Instead the processor 20 orders the reconstructor 22 to reconstruct the missing data from the associated data blocks in the normally responding disks 12–14.

Figure 5:
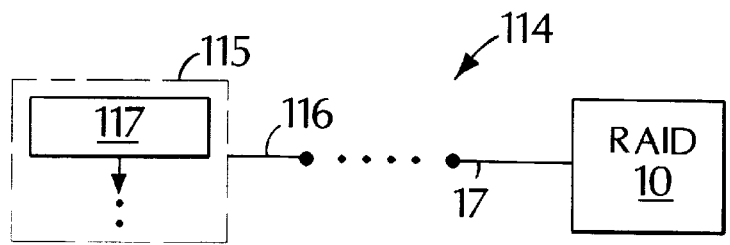
FIG. 5 illustrates a video transmission and reception system using the RAID configuration of FIG. 1.

FIG. 5 illustrates a video transmission system 114, which uses the RAID configuration 10 of FIG. 1. A receiver 115 receives data blocks transmitted from the interface or line 17 at an input terminal 116. Transmission between the RAID configuration 10 and receiver 116 may be by radio wave, light, and/or cable transmission. The input terminal 116 couples to a input data buffer 117, e.g., a first-in-first out buffer. The input data buffer 117 stores two to several times the quantity of data included in one data block shown in FIG. 2B. Data stored in the input data buffer 117 provides for continuous video data processing in the event of a short transmission interruption.

Referring to FIGS. 1 and 5, the video transmission system 114 can lower the occurrence of viewing pauses by transmitting a reconstructed data block in response to detecting a slow disk 12–14. In one embodiment of the system 114, the RAID configuration 10 needs about 100 ms to transmit or reconstruct a data block, and the receiver's input data buffer 117 stores about 2000 ms of video data. The timer 34 counts down a predetermined period of about 400 ms to determine whether one of the disks 12–14 is slowly responding. For this choice of the predetermined period, even several sequential slow disk responses will not empty the receiver's input data buffer 117 to produce a noticeable pause in a video being viewed.

Various embodiments may employ different numbers of disks than the RAID configuration 10 of FIG. 1. Some embodiments use more disks to increase the access bandwidth and/or to lower read latencies. On the other hand, a RAID-1 configuration employs only two disks to store duplicate data blocks. In a RAID-1 configuration, a processor controls the transmission of stored data blocks. The processor commands the second disk to transmit a duplicate of a data block in response to the first disk not completing transmission of the data block within a predetermined time.

In the various embodiments, a read lasting longer than a predetermined time provokes a reconstruction of data from associated data from other disks and a transmission of the reconstructed data. This increases the predictability of read latencies for the RAID configurations described herein.

Some embodiments of RAID configurations store associated data and parity blocks differently than the pattern shown in FIG. 2B. These RAID configurations still transmit reconstructed data in response to detecting a slowly responding disk. To enable reconstruction of data of a slowly responding disk, each disk stores, at most, one block from any group formed of associated data and parity blocks.

Figure 6:
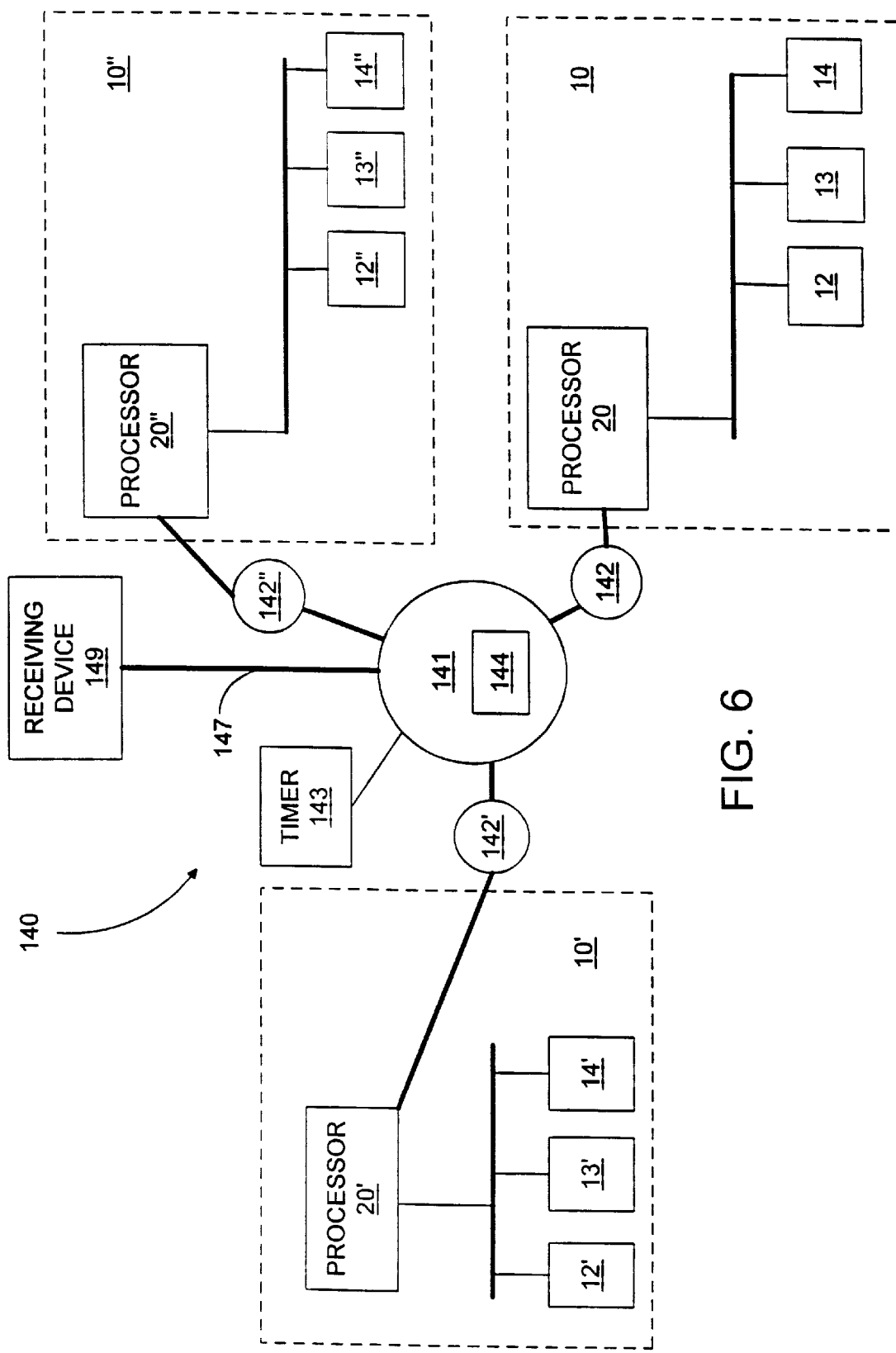
FIG. 6 shows a two-level RAID configuration employing three of the RAID configurations shown in FIG. 1.

FIG. 6 shows a RAID configuration 140 with both first and second level RAID-5 structures. At the first level, a first level processor 141 receives consecutive groups of pairs of data blocks and generates a parity block to associate with each pair of data blocks. The first level processor 141 sends one block from each associated group of three blocks to each of the interfaces 142, 142', 142" of the second level RAID configurations 10, 10', 10". Each second level processor 20, 20', 20" subsequently breaks each block into two mini-blocks and generates a parity mini-block to associate with the two mini-blocks. Each second level RAID configuration 10, 10', 10" stores the mini-blocks as illustrated in FIGS. 2A and 2B. The first level processor 141 retrieves blocks from the second level RAID configurations 10, 10', 10" and transmits the retrieved blocks over an interface or line 147 to a receiving device 149.

Still referring to FIG. 6, the two-level RAID configuration handles slowly responding storage structures by reconstructing and transmitting reconstructed blocks at the first level. A first level reconstructor 144 reconstructs and transmits to the receiving device 149 the reconstructed block if any second level RAID configuration 10, 10', 10" responds slowly. A slow response is signaled by the first level processor 141 if the timer 143 counts a predetermined time before all second level RAID configurations 10, 10', 10" complete transmission of requested data blocks. The timer 143 starts counting the predetermined time in response to the processor 141 sending a new read request to the second level RAID configurations 10, 10', 10". Thus, the two-level RAID configuration 140 deals handles slow responses in the second-level RAID configurations 10, 10', 10" at the first level. Even if the second level Raid configurations 10, 10', 10" do not have timers, like the timers 34 of FIG. 1, the first level processor 141, timer 143, and reconstructor 144 can handle latencies due to slow disk responses. These first level devices build predictability into the read latencies of the RAID configuration 140.

In some embodiments, the processor 141 is programmed to simulate the first level RAID-5 structure of FIG. 6, i.e. to simulate the timer 143, and the reconstructor 144. The processor 141 may also control the processors 20, 20', 20" if they are programmable.

Additions, deletions, and other modifications of the described embodiments will be apparent to those practiced in this field and are within the scope of the following claims.

What is claimed is:

1. A redundant array of inexpensive disks comprising:
   a pluarality of disks;
   a bus coupled to said disks and adapted to transmit data blocks from said disks to a receiving device; and
   a reconstructor adapted to reconstruct a data block of one of said disks with associated data and parity blocks from other of the disks and to directly transmit the reconstructed block to the receiving device in response to determining that the one of the disks has not responded within a normal time interval for responding to a read request.

2. The redundant array of claim 1 wherein a slowly responding disk does not complete transmission of a requested data block within a predetermined time.

3. The redundant array of claim 2, further comprising:
   a processor adapted to send a signal to the reconstructor in response to the one of the disks slowly responding; and
   wherein the reconstructor is adapted to transmit the reconstructed block to the receiving device in response to receiving the signal.

4. The redundant array of claim 3, wherein the processor is adapted to request the other of the disks to send associated data and parity blocks to the reconstructor in response to the one of the disks responding slowly.

5. The redundant data array of claim 3, wherein the processor couples to the plurality of disks and is adapted to control writes of associated data and parity blocks to said disks.

6. A method of transmitting data from a redundant array of inexpensive disks (RAID configuration), comprising:

requesting a first disk of the RAID configuration to transmit a first data block stored therein to a receiving device;

reconstructing the first data block from the associated data stored in other disks of the RAID configuration; and transmitting the reconstructed first data block directly to the receiving device; and wherein the reconstructing and the transmitting are performed in response to the first disk providing data in the first data block, but not completing a transmission of the first data block within a normal time interval for responding to a read request.

7. The method of claim 6, wherein the associated data comprises at least one data block and a parity block.

8. The method of claim 6, wherein the reconstructing and the transmitting are performed in response to determining that the first disk is slowly responding.

9. The method of claim 6, further comprising:

providing a time signal at a predetermined time after the requesting; and wherein the transmitting is in response to an occurrence of the time signal before the first disk completes transmission of the first data block.

10. The method of claim 7, wherein the reconstructing comprises calculating a bit-by-bit exclusive-OR for corresponding bits of data and parity blocks associated with the first data block.

11. A redundant array of inexpensive disks (RAID) configuration to transmit data blocks to a receiving device, comprising:

a plurality of disks adapted to store the blocks and to directly transmit the stored blocks to the receiving device;

a processor to control reads from and writes to the plurality of disks and to determine if one of the disks is responding within a normal time interval; and a device adapted to reconstruct a block stored in a slowly responding one of the disks from associated blocks stored in others of the disks in response to the processor determining that the one of the disks has not responded within the normal time interval and to directly transmit the reconstructed block to the receiving device.

12. The RAID of claim 11, wherein the processor is configured to determine that the one of the disks is slowly responding if the one disk does not finish transmitting a requested data block within a predetermined time.

13. The RAID configuration of claim 12, further comprising:

a timer coupled to the processor and adapted to count the predetermined time in response to the processor sending a request to a disk to transmit a data block.

14. A two-level redundant array of inexpensive disks (RAID), comprising:

a plurality of second level redundant arrays of inexpensive disks, a first level processor adapted to write first level blocks to and read first level blocks from the second level arrays; and each second level array comprising:

a plurality of disks adapted to store second level blocks and to retrieve stored blocks and a first level device to reconstruct a particuilar first level block from associated first level blocks and to directly transimit the reconstructed first level block to a receiving device in response to a determination that a second level array responding slowly has not responded within a normal time interval.

15. The RAID configuration of claim 14, wherein the first level processor is adapted to signal the first level device that one of the second level arrays is responding slowly if the one of the second level arrays does not complete a transmission of a requested first level block in a predetermined time.

16. The RAID configuration of claim 14, each second level array further comprising:

a second level processor to request reads of and writes to the disks of the associated second level array.

* * * * *